(12) United States Patent
Kumar

(10) Patent No.: US 7,352,996 B2
(45) Date of Patent: Apr. 1, 2008

(54) SYSTEM AND METHOD FOR COUPLING USERS TO A RETAIL COMPUTER SYSTEM WITH LOW RISK OF EAVESDROPPING

(75) Inventor: Alok Kumar, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 303 days.

(21) Appl. No.: 10/112,318

(22) Filed: Mar. 29, 2002

(65) Prior Publication Data
US 2003/0184430 A1 Oct. 2, 2003

(51) Int. Cl.
*H04B 5/00* (2006.01)
(52) U.S. Cl. .......... 455/41.1; 455/575.1; 455/575.6; 455/100; 340/5.1; 340/5.2; 340/5.61; 340/5.81; 340/5.82
(58) Field of Classification Search ...... 455/41.1–41.2, 455/575.1, 6, 90.1–90.3, 100; 379/55.1; 340/5.64, 5.1–5.2, 10.34, 5.61, 64, 5.4–5.42, 340/5.51–5.52, 5.8–5.85, 825.19–825.29, 340/5.7–5.74
See application file for complete search history.

(56) References Cited

U.S. PATENT DOCUMENTS

| | | | | |
|---|---|---|---|---|
| 5,682,032 A | * | 10/1997 | Philipp | 235/422 |
| 5,796,827 A | * | 8/1998 | Coppersmith et al. | 713/182 |
| 5,914,701 A | * | 6/1999 | Gersheneld et al. | 345/156 |
| 6,034,617 A | * | 3/2000 | Luebke et al. | 340/5.62 |
| 6,211,799 B1 | * | 4/2001 | Post et al. | 341/33 |
| 6,642,837 B1 | * | 11/2003 | Vigoda et al. | 340/10.1 |
| 6,711,161 B1 | * | 3/2004 | Erimli | 370/360 |
| 6,771,161 B1 | * | 8/2004 | Doi et al. | 340/5.64 |
| 6,938,821 B2 | * | 9/2005 | Gangi | 235/380 |

OTHER PUBLICATIONS

Zimmerman, T.G., Smith, R.J., Paradiso, J.A., Allport, D. and Gershenfeld, N. "Applying Electric Field Sensing to Human-Computer Interfaces."*CHI '95 Proceedings Papers*. 1995, Online. Internet. Available: <http://www.acm.org/sigchi/chi95/Electronic/documnts/papers/tgz_bdy.htm>.

* cited by examiner

*Primary Examiner*—Tuan A. Tran
(74) *Attorney, Agent, or Firm*—Maginot, Moore & Beck LLP

(57) ABSTRACT

A system reduces the risk of eavesdropping on data used to access an establishment's computer network. In one embodiment, a system includes a personal area network (PAN) access device that couples a low power, low frequency modulated signal to a wearer, the PAN access device including a data storage unit for storing personal identification data including biometric data and a modulator for modulating a low power, low frequency signal with the personal identification data, a personal area network (PAN) receiver for receiving the modulated signal, a database for storing purchasing data for a plurality of customers, a memory including instructions which, when executed, associate the received personal identification data with the stored shopping data for one of the plurality of customers and a microprocessor for executing the stored instructions.

17 Claims, 3 Drawing Sheets

SYSTEM AND METHOD FOR COUPLING USERS TO A RETAIL COMPUTER SYSTEM WITH LOW RISK OF EAVESDROPPING

FIELD OF THE INVENTION

This invention relates generally to secure access devices for computer systems and, more particularly, to personal identification devices for computer systems.

BACKGROUND OF THE INVENTION

Computers are used in a variety of ways in retail establishments. They not only are used to implement payments but they are increasingly used to promote goods and services to users on the premises of the establishment. Typically, computers in a retail establishment may be used to attract a customer's attention to a store display and then generate electronic coupons or the like in an effort to entice the customer to accept some offer at the display. To identify customers so their buying habits and preferences may be monitored and analyzed, many stores are instituting preferred customer programs. In these programs, customers provide some identification data, such as a name and address, and receive a customer token that contains or bears a unique identifier. The token may be a hard polymer tag bearing a bar code that may be coupled to a customer's key chain. When the customer goes to a checkout terminal to pay for goods or services, the preferred customer token is typically scanned so the data regarding the goods and services purchased may be associated with the customer identification code. This data may be stored and later analyzed for determining customer buying patterns and other important marketing data for an establishment.

In those systems where electronic coupons are generated, the scanning of a preferred customer token may be used to capture the preferred customer identification code. This code may then be used to query a database and, based upon the customer's marketing data, coupon discounts may be offered. For example, customers who have spent an amount of money with the establishment that exceeds some threshold may be offered greater discounts than one who has not reached the threshold. This system may then be used to give incentive to customers to use their preferred customer tokens in a store.

One problem with computer systems that read customer identification data, either from preferred customer tokens or financial token, such as credit cards or the like, is the contact required for token reading. Systems that read bar codes require transparent platens and laser readers that need to be oriented for optimal reading of the bar code. Additionally, the expense of such optical readers may be cost prohibitive for distributing the readers at a plurality of sites in a large establishment. Also, customers may tire of pulling their key chains from their pockets or purses for scanning purposes and choose instead to pass the coupon offer station. Although wireless transmitters encoded with a customer identification code may be used, a number of issues arise from their use as customer tokens. For one, wireless transmitters typically have sufficient transmission range that the simultaneous activation of a plurality of transmitters in an enclosed area may result in signal interference. Another problem may arise where the code identified in the wireless signal corresponds to financial transaction codes or account numbers for a customer. Persons desiring to obtain such codes in an authorized manner may carry receivers with memory devices so they can surreptitiously receive the wireless signals and stored them for later analysis.

What is needed is a system through which a computer system may receive customer identification codes without requiring optical scanners or the like.

What is needed is a system that receive customer identification codes without making the data susceptible to eavesdropping.

SUMMARY OF THE INVENTION

A system and method that operates in accordance with the principles of the present invention overcome the above-noted limitations of previously known customer identification code receivers. The system of the present invention comprises a personal area network (PAN) access device that couples a low power, low frequency modulated signal to a wearer and a personal area network receiver for receiving the modulated signal. The personal area network access device includes a personal data storage unit and a low power data modulator. The low power data modulator modulates a low power, low frequency signal with the data from the storage unit. This signal is capacitively coupled to the wearer's body so it may be emitted to a PAN receiver. When the wearer brings a body part such as a finger in proximity to or in contact with the PAN receiver, the receiver may receive the modulated signal. The signal may then be demodulated to obtain the user data so it may be encoded in data messages provided to a server of an establishment computer system. The user data may then be used to access marketing data for the customer or to implement a financial transaction. An advantage of the PAN transmitter is that it may be incorporated within a piece of jewelry such as a watch, necklace, or bracelet as a wearable computer. Transmission of the modulated signal by the low power, low frequency signal emitted by the wearer's body helps reduce the opportunity for eavesdropping as the signal is not radiated at a distance that facilitates undetected eavesdropping. Thus, access to marketing and financial transaction data for a customer is made more secure by a system of the present invention.

In a preferred embodiment of the present invention, the wearable computer also includes a receiver for receiving financial data from a transmitter associated with the PAN receiver. The financial data may be used to update data within the wearable computer such as is stored in a smart card or the like. Additionally, the financial data may be discount data that may then be presented to a PAN receiver associated with a checkout terminal.

The method of the present invention includes modulating a low power, low frequency signal with user data and capacitively coupling the modulated signal to a user's body for transmission. The method may also include receiving the modulated signal and relaying the user data to a server for accessing customer marketing data or for implementing a financial transaction. The financial data may be data for updating an account stored in a wearable computer or it may be discount data that may be later presented to a PAN receiver associated with a checkout terminal.

It is an object of the present invention to reduce the likelihood of another eavesdropping on the transmission of a personal identification code used to access a computer network.

It is an object of the present invention to enable entry of a personal identification code without requiring contact of a token with a reader.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating an exemplary embodiment and are not to be construed as limiting the invention.

DETAILED DESCRIPTION OF THE INVENTION

Figure 1:
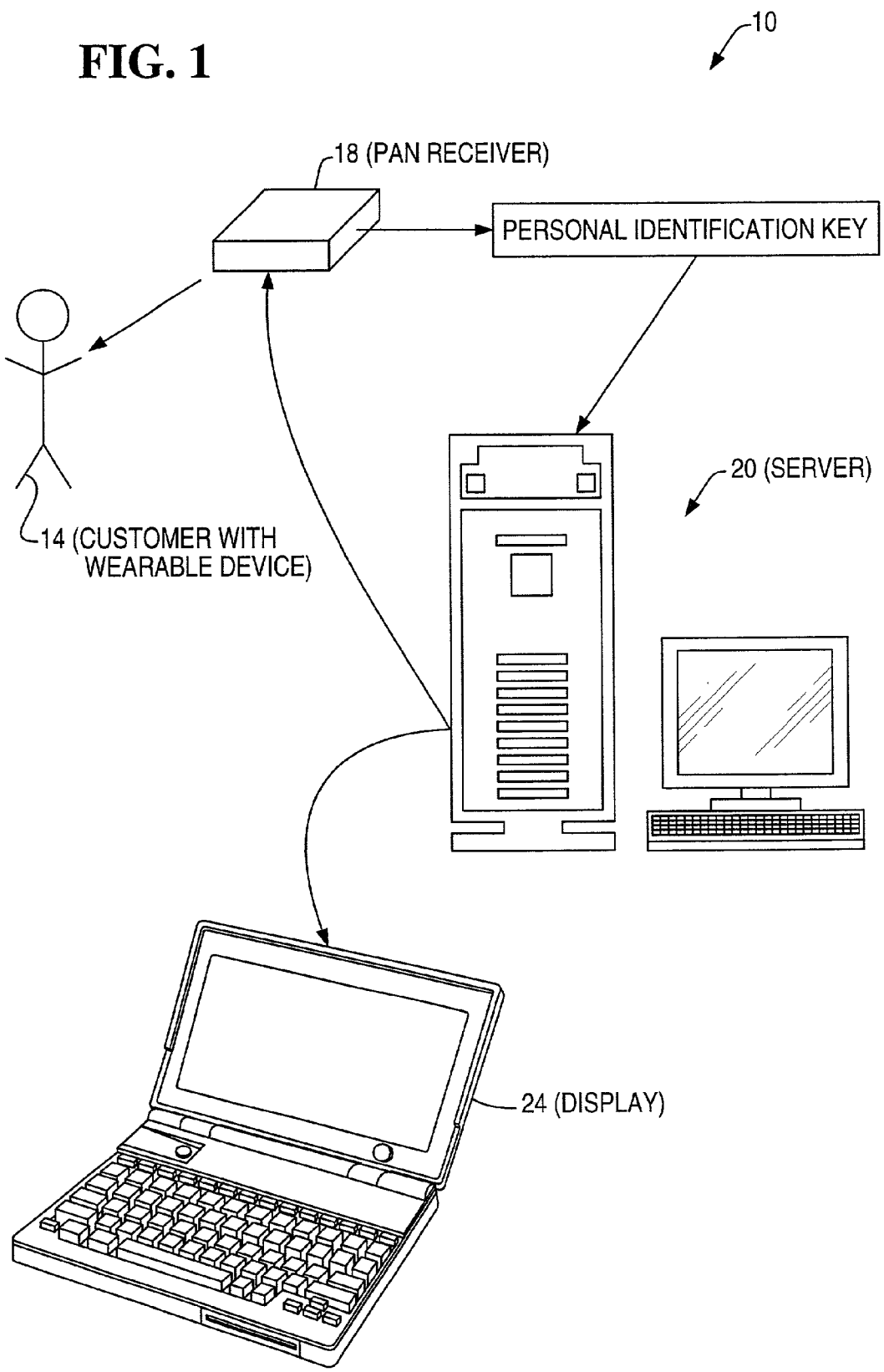
FIG. 1 is a block diagram of a system incorporating the principles of the present invention.

A computer system incorporating the principles of the present invention is shown in FIG. 1. System 10 includes a personal access network (PAN) device such as a wearable computer 14, a personal area network receiver 18, and a server 20. System 10 may also a computer station 24 that may be a checkout terminal or the like. Wearable computer 14 is comprised of a low power transmitter, low frequency transmitter that is powered by the human body salinity. Device 14 generates an external electric field that is transmitted by the human body brought in close proximity or contact with PAN receiver 18.

Figure 2:
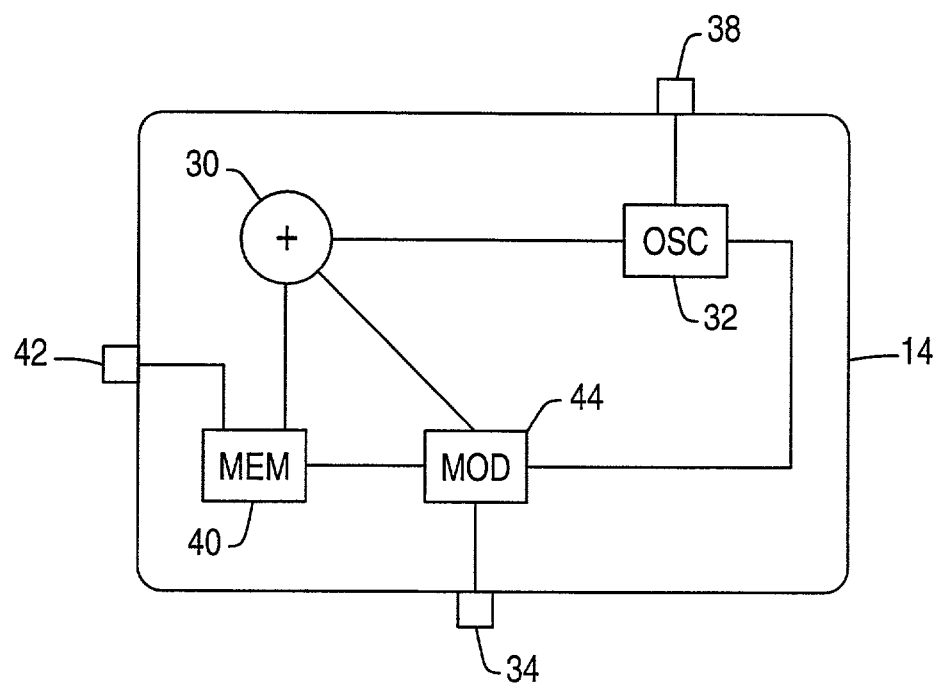
FIG. 2 is a block diagram of the wearable computer shown in the system of FIG. 1.

Device 14 is shown in more detail in FIG. 2. Device 14 is powered by an internal power source 30 such as a watch battery or the like. Power source 30 is coupled to an oscillator 32 to generate an electrical potential between electrode 34 and a virtual ground electrode 38. Virtual ground electrode 38 is held at zero potential by an operational amplifier within oscillator 32 so a current flows to ground through the oscillator electrode. As long as the area of electrodes 34 and 38 are small relative to the spacing between them, the electrodes act as point charges that produce dipole fields. The body of the person wearing device 14 cuts the electric field lines of these dipole fields, and at close proximity to electrodes 34 and 38, the body of the person acts as a charge reservoir so the current to ground increases. A device of this type is described in an article entitled *Applying Elecric Field Sensing to Human-Computer Interfaces* by T. Zimmerman, J. Smith, J. Paradiso, D. Aliport, and N. Gershenfeld that is part of the CHI '95 Proceedings Papers. That article is hereby incorporated by reference in its entirety. Such a device generates a signal having a current measured in picoamps and its frequency is less than 1 MHz.

A data storage unit 40 in which personal identification data and/or financial account data may be stored is also coupled to power source 30. When a wearer activates electrical switch 42, modulator 44 retrieves user data from storage unit 40 and modulator 44 modulates the current at electrode 34. The modulated current is capacitively coupled to the wearer's body and a low power, low frequency signal modulated with the personal identification data is emitted by the wearer. When the wearer brings a finger or other body part into proximity or contact with PAN receiver 18, the modulated signal may be received and demodulated to obtain the user data.

The low power, low frequency signal emitted from the person is not radiated at power levels sufficient for reception by eavesdropping devices unless they practically come in contact with the person. Consequently, the opportunity for signal interference and eavesdropping is significantly reduced by the device of the present invention. PAN receiver 18 may also be provided with a low power, low frequency transmitter that may be used to return data to device 14. Preferably, receiver 18 is provided with a visual and/or audio indicator that a data message for device 14 is ready. To receive the message, the wearer again brings a finger or other body part into proximity or contact with PAN receiver 18 and the signal from the transmitter of receiver 18 is coupled to the person's body. The signal may then be detected at the ground electrode as the modulated signal at electrode 34 ceases upon release of the electrical switch activating modulator 44. The modulations in the ground current may be demodulated and used to generate data that may be stored in storage unit 40. In this manner, data may be transferred between PAN receiver 18 and device 14 to update financial data such as that that may be stored in a smart card or the like.

In system 10, device 14 may be used to provide user data such as personal identification data or financial transaction data to a PAN receiver 18 for processing by a retail establishment computer server 20. Server 20 may use the personal identification data to query a customer database for information about the identified customer. Server 20 may use the customer data to retrieve a promotion offer that corresponds to the customer's buying habits and other data stored in the customer database. The offer data may be presented to the customer through the display of a computer station 24 associated with PAN receiver 18. Computer station 18 may be an application specific integrated circuit (ASIC) for displaying promotion data or it may be a checkout terminal for processing payment data. In the latter case, the personal identification data received from device 14 may include financial account data that may be used by server 20 to generate data messages for obtaining credit card transaction authorization through a payment processor. Upon receipt of the authorization code, server 20 sends an authorization message to station 24 so the transaction may be completed. Also, server 20 may send transaction data to PAN receiver 18 for transmission to device 14 if PAN receiver 18 is provided with a transmitter for communicating with device 14. Thus, device 14 and receiver 18 may communicate in a unidirectional mode or in a bi-directional mode.

Figure 3:
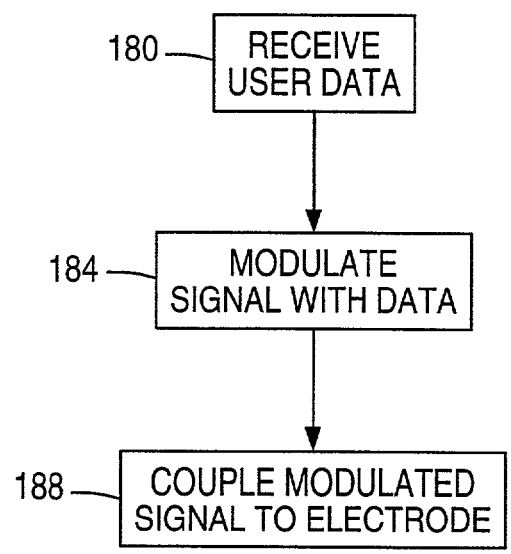
FIG. 3 is a block diagram of computer software that may be used to implement the system and method of the present invention.

The software for implementing system 10 is shown in FIG. 3. User personal data storage 40 may be used to store a personal identification key such a preferred customer identification number or other identification codes such as a key generated from biometric data to further enhance the security of the system. Storage unit 40 may also include credit card data or other financial account data as may be stored in a smart card or the like. A select feature function (block 100) may be activated by a user with dedicated actuators on device 14 or through a limited function keyboard of the device. The features include personal identification, payment transaction, or other functions that may be available through server 20 of system 10. Personal identification may be used to retrieve promotion offers or other customer incentives while payment transaction may be used to effect payment at a checkout terminal or the like. A retrieve user information function (block 104) queries storage unit 40 for the data that corresponds to the activated function. This data is provided to a send user information function (block 108) for transmission to PAN receiver 18.

Figure 4:
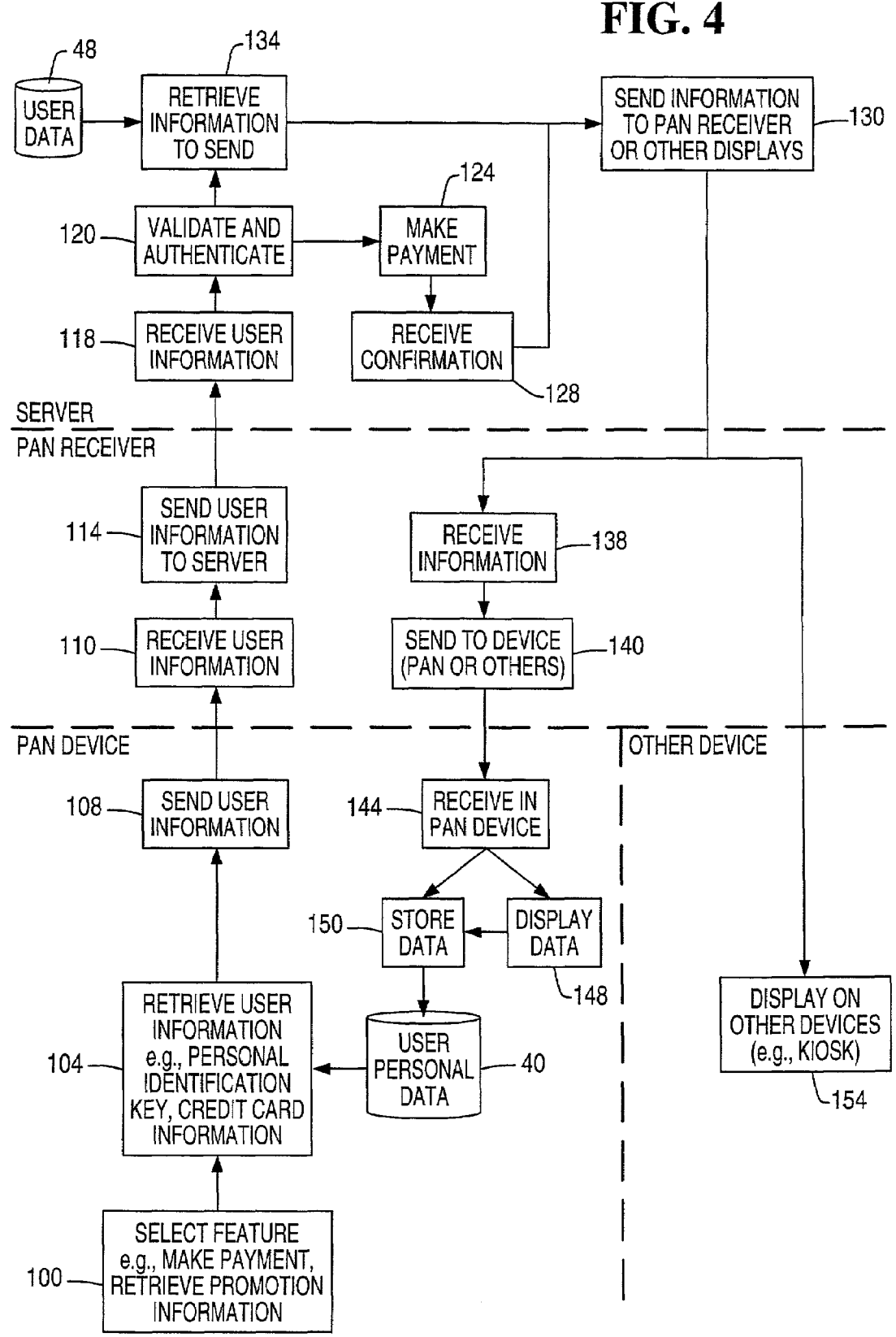
FIG. 4 is a flow chart of an exemplary process that may be implemented in the network access device of the system shown in FIG. 1.

An exemplary process of the send user function is shown in FIG. 4. That process receives user information, either personal identification data or financial transaction data, (block 180) and modulates the current at electrode 34 with the received data (block 184). The method of modulation may be according to any known scheme of low power, low frequency signal modulation. Likewise, the messages containing the user information data may formatted according to any known message format used for such purposes or it may be a proprietary scheme used to communicate with a server 20. The modulated signal is coupled to electrode 34 (block 188) so it may be capacitively coupled to the wearer's body for transmission.

Returning to FIG. 3, PAN receiver 18 includes a function for receiving the low power, low frequency signal emitted by the wearer's body and demodulating that signal to obtain the user information (block 110). This information may then be used to generate data messages for communication with server 20 (block 114).

Server 20 includes a function to receive the user data messages (block 118) and use the information to validate and authenticate the user (block 120). For example, PAN receiver may be coupled to a fingerprint imaging device that generates an image of a person's fingerprint and encodes that data for transmission to server 20. The validate and authenticate function may then compare the biometric data received from device 14 to the fingerprint image to determine whether the wearer corresponds to the received user information. Other known validation schemes may be used such as entry of a PIN code or the like. Once validated, server 20 determines whether a payment transaction is occurring and activates the make payment function (block 124) in response. The make payment function uses the user data to generate the necessary data messages for communication with a payment processor. Upon receipt of an authorization code, the receive confirmation function (block 128) provides an authorization message to send data function (block 130) for server 20. In response to the validation function determining the wearer and user data correspond but the user is not requesting a payment transaction, the data message is passed to the retrieve user data function (block 134) for server 20. The retrieve user data function determines the location and/or function of PAN receiver 18. For example, location of PAN receiver 18 at a promotion site may result in the retrieve user data function of server 20 querying database 48 to determine an activity level for the customer. This data may be used to generate a promotion offer, discount, or the like. This data may then be formatted in a data message and provided to the send data message function (block 130) of server 20. This function may then send messages to PAN receiver 18 or computer station 24.

Data messages for device 14 are received by the receiver function (block 138) of PAN receiver 18 and converted to the low power, low frequency signal levels and format for device 14 by the send data function (block 140). This signal is received by the wearer's body and detected at electrode 38 by receive data function (block 144) of device 14. The data may be displayed at wearable device 14 by display data function (block 148) and/or stored in storage unit 40 by store data function (block 150). Likewise, data messages sent from server 20 to computer station 24 are received, processed, and displayed by functions resident in computer station 24 (block 154).

To implement system 10, wearable computers are issued to customers with storage units 40 that contain their personal identification data and/or financial account data for credit card, smart card, or other financial token transactions. PAN receivers are then installed at promotion sites throughout a retail establishment or the like or in association with checkout or other payment terminals. The PAN receivers are programmed to communicate in data messages that comply with the network communication requirements of the network managed by server 20. Server 20 is also provided with the functions for validating and authenticating users with data received from wearable computers. In operation, customers upon the premises of an establishing having PAN receivers may then access the network managed by server 20 by activating wearable device 14 to generate a personal identification signal or a financial transaction signal. PAN receiver 18 may then provided the personal identification or financial transaction signal in a network compatible message to server 20 for authentication and validation and other processing. Server 20 responses with appropriate data messages that may be returned to wearable computer 14 via PAN receiver 18 or to computer station 24. In this manner, customers are able to access an establishment's computer system at network access points without significant risk of compromising personal identification or financial account data.

While the present invention has been illustrated by the description of an exemplary process and system components, and while the process and various components have been described in considerable detail, the applicant does not intend to restrict or in any limit the scope of the appended claims to such detail. For example, the system and method of the present invention may be used in any electronic device having a display for which brightness control is available. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for providing user access to an establishment's computer network comprising:

a personal area network (PAN) access device that couples a low power, low frequency modulated signal to a wearer, the PAN access device including a data storage unit for storing personal identification data including biometric data and a modulator for modulating a low power, low frequency signal with the personal identification data;

a personal area network (PAN) receiver for receiving the modulated signal;

a database for storing purchasing data for a plurality of customers;

a memory including instructions which, when executed, associate the received personal identification data with the stored purchasing data for one of the plurality of customers; and a microprocessor for executing the stored instructions.

2. The system of claim 1, wherein the PAN access device comprises a housing sized to be worn by a user, the data storage unit and modulator located within the housing.

3. The system of claim 2 wherein the PAN access device is configured as a component of a piece of jewelry.

4. The system of claim 1, wherein the PAN access device further comprises an electrode for capacitively coupling the modulated signal to a wearer's body for transmission to the PAN receiver.

5. The system of claim 4, the PAN access device further comprising:
a receiver for receiving a low power, low frequency modulated signal; and
a demodulator for demodulating the received signal for obtaining user data to be stored in the data storage unit.

6. The system of claim 1, wherein the data storage unit contains financial data.

7. A method for providing access to an establishment's computer network comprising:
retrieving biometric data of a user from a data storage unit born by the user;
modulating a low power, low frequency signal with the biometric data;
transmitting the modulated signal by capacitively coupling with the user's body;
receiving the transmitted modulated signal; and
retrieving prior purchasing activity data of the user from a memory remote from the user based upon the received signal.

8. The method of claim 7, further comprising:
retrieving financial data from the data storage unit;
modulating the low power, low frequency signal with the financial data; and
accessing the memory remote from the user based upon the received signal.

9. The method of claim 7, further comprising:
detecting a signal with an electrode born by the user;
demodulating the detected signal to obtain data; and
storing the data in the data storage unit.

10. The method of claim 9, wherein:
the method further comprises positioning a body part of the user proximate to a personal area network (PAN) receiver; and
transmitting the modulated signal comprises transmitting the modulated signal through the body part.

11. The method of claim 7, further comprising:
generating a promotional message based upon the retrieved prior purchasing activity; and
communicating the promotional message to the user.

12. The method of claim 11, further comprising:
detecting a signal with an electrode born by the user;
demodulating the detected signal to obtain the promotional message; and
displaying the promotional message.

13. A method for providing access to an establishment's computer network comprising:
storing data associated with a customer in a database remote from the customer;
modulating a low power, low frequency signal with data identifying the customer;
capacitively coupling the modulated signal to the customer's body for transmission to a network of the establishment;
receiving the transmitted modulated signal with a network receiver located proximate to the customer;
associating the received customer data with the stored data associated with the customer;
determining the dollar amount of purchases associated with the customer;
comparing the obtained dollar amount with a threshold dollar amount; and
determining a coupon to be offered based upon the comparison.

14. The method of claim 13, further comprising:
detecting a signal from a network transmitter with a receiver born by the customer;
obtaining data corresponding to the coupon from the detected signal; and
storing the data corresponding to the coupon to a memory device born by the customer.

15. A method for providing access to an establishment's computer network comprising:
storing data associated with a customer in a database remote from the customer;
modulating a low power, low frequency signal with data identifying the customer;
capacitively coupling the modulated signal to the customer's body for transmission to a network of the establishment;
receiving the transmitted modulated signal with a network receiver located proximate to the customer;
associating the received customer data with the stored data associated with the customer;
locating the network receiver at a specific promotion site;
generating a promotional message based upon the associated stored data and the specific promotion site; and
providing the promotional message to the customer.

16. The method of claim 15, wherein generating a promotional message comprises:
determining a dollar amount of purchases associated with the customer;
comparing the obtained dollar amount with a threshold dollar amount; and
determining the promotional message to be generated based upon the comparison.

17. A method for providing access to an establishment's computer network comprising:
storing data associated with a customer in a database remote from the customer;
modulating a low power, low frequency signal with data identifying the customer;
capacitively coupling the modulated signal to the customer's body for transmission to a network of the establishment;
receiving the transmitted modulated signal with a network receiver located proximate to the customer; and
associating the received customer data with the stored data associated with the customer,
wherein modulating a low power, low frequency signal comprises:
modulating a low power low frequency signal with customer biometric data.

* * * * *